UNITED STATES PATENT OFFICE.

BRADFORD BORDEN AND GEORGE TOWNSEND, OF PAWTUCKET, AND EDWARD A. GREENE, OF LINCOLN, RHODE ISLAND.

IMPROVEMENT IN COMPOSITION COATINGS FOR DRAWING-ROLLERS FOR CARDING-MACHINES.

Specification forming part of Letters Patent No. 130,694, dated August 20, 1872.

*To all whom it may concern:*

Be it known that we, BRADFORD BORDEN, of Pawtucket, GEORGE TOWNSEND, of the same place, and EDWARD A. GREENE, of Lincoln, all of the county of Providence and State of Rhode Island, have invented a new and useful Coating for Drawing-Rollers for Carding and Spinning Machines; and we do hereby declare that the following specification is a full, true, and exact description thereof.

Our improvement is specially applicable to rollers which are covered with a composition composed mainly of glue and glycerine, and treated with tanning agents, and which is known as a glycero-gelatinous compound. Rollers so covered, while possessing peculiar advantages over rollers for similar purposes covered with leather or rubber, are subject, however, to be affected by atmospheres heavily charged with vapor, and especially during the hot summer months are liable to become sticky and "lick up" the fibrous material which passes between them. To prevent this is the object of our invention; and it consists in coating such rollers with a composition which protects them from injurious atmospheric influence.

We make a solution of gum shellac, dissolved in alcohol, of about the consistency of ordinary shellac varnish. To a pint of this solution we add a gill of linseed-oil, and to this mixture we prefer to add a small quantity of alum, say, in the proportion of a tablespoonful to a gallon. This mixture produces a coating which when applied to such rollers renders them impervious to moisture and to the softening influence of a hot water-charged atmosphere.

The proportions which we have named need not be precisely followed, though we have obtained the best results from the formula given.

Our invention is employed, if a solution of shellac and linseed-oil is used, in the proportions substantially as described, for a coating, whether alum be added or not.

To our composition any pigment to give a color which may be preferred can be employed; but such addition constitutes no part of the invention.

What we claim as our invention, and desire to secure by Letters Patent, is—

The composition, for coating glycero-gelatinous rollers for carding and spinning machines, composed of the ingredients substantially as specified.

BRADFORD BORDEN.
   GEORGE TOWNSEND.
   EDWARD A. GREENE.

Witnesses:
 EDWIN C. PIERCE,
 THOMAS COSGROVE.